Sept. 5, 1950     D. C. KENNARD, JR     2,520,937
SPRING AND VIBRATION DAMPER THEREFOR
Filed May 19, 1949     2 Sheets—Sheet 1
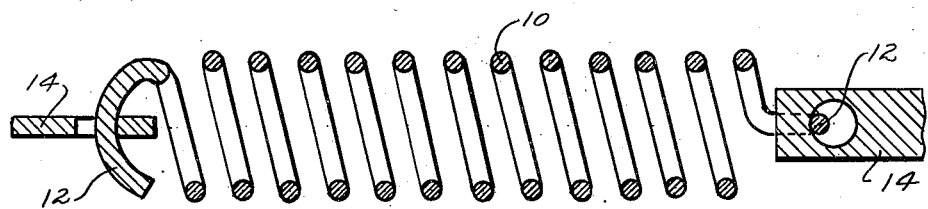
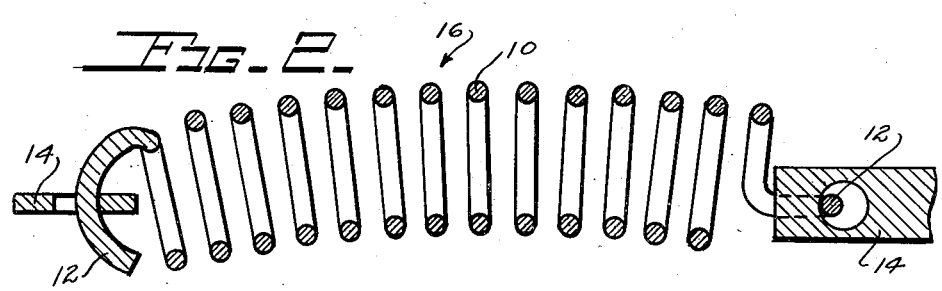
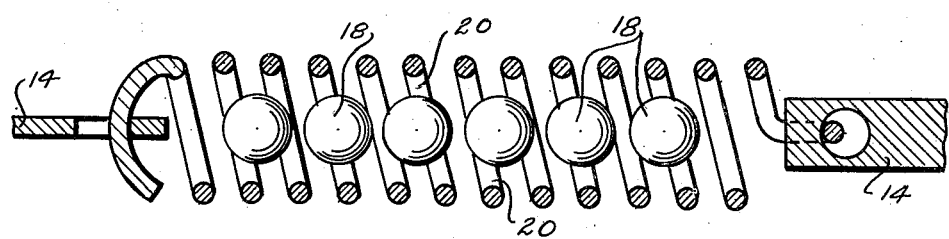
INVENTOR.
DWIGHT C. KENNARD JR.
BY Wade Koontz AND
Frederick W. Cotteman
ATTORNEYS Sept. 5, 1950  D. C. KENNARD, JR  2,520,937
SPRING AND VIBRATION DAMPER THEREFOR
Filed May 19, 1949  2 Sheets-Sheet 2

INVENTOR
DWIGHT C. KENNARD JR.
BY Wade Coonty AND
Frederick W. Cotterman
ATTORNEYS Patented Sept. 5, 1950

2,520,937

UNITED STATES PATENT OFFICE 2,520,937

SPRING AND VIBRATION DAMPER THEREFOR

Dwight C. Kennard, Jr., Dayton, Ohio

Application May 19, 1949, Serial No. 94,243

9 Claims. (Cl. 267—1)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to a spring and a spring damper and has special reference to a means for damping out resonant vibration in coil springs.

An object of the invention is to provide an effective yet inexpensive means for damping out resonant vibrations in coil extension or compression springs.

More specifically, the object is to provide means for preventing the build-up of undesirable radial or transverse resonant modes in a spring under stress.

Another object is to provide a damping means which may be contained within the confines of a conventional coil spring with no special mechanism required for maintaining the spring and the damper in assembly.

Another object is to so construct and arrange a coil spring and damping means assembly that commercially available parts may be employed for both the spring and the damping means.

Other objects, advantages and meritorious features will become apparent as the invention is hereinafter described in greater detail, reference being had to the drawing, wherein:

Fig. 1 shows an extension spring of the kind to which my invention appertains mounted horizontally.

Fig. 2 shows the extension spring of Fig. 1 but under a state of lateral vibration.

Fig. 3 shows the extension spring of Figs. 1 and 2 with corrective means applied in accordance with my invention.

Figure 4:
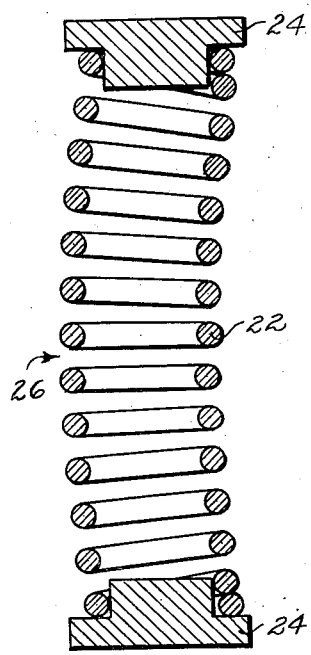
Fig. 4 shows the spring of Fig. 1 mounted for vertical compression and under vibration.

Referring to Fig. 1, a coil spring 10, has the usual attaching ends 12 formed by bending the end turns of the spring ninety degrees. The spring is shown extended and under considerable stress with the attaching ends 12 held axially spaced apart by the spring supports 14.

In Fig. 2 the spring 10 is shown as it appears when subjected to lateral resonant vibration. The coils are shown only in one of the laterally deflected positions 16, as the spring, when it is under its resonant vibration, appears to an observer when viewed through a stroboscope.

In Fig. 3 the spring 10 is being subjected to the same lateral vibration as it was in Fig. 2, except that in Fig. 3 the corrective means which is the subject of my invention has been applied. This corrective means in the instant case comprises a series of balls 18 of sufficient diameter not to pass between the coils of the spring or through the ends. The diameter of the balls is small enough to allow radial clearance as at 20 between the balls and the inside diameter of the spring.

In operation the balls are tossed from one side of the spring to the other by the vibration of the coils of the spring faster than the eye can follow so that they have the appearance of being supported in mid air along the axis of the spring. The balls maintain their axially spaced apart relation presumably because they strike each other in their movement from one side to the other of the coil, and they damp out resonant vibration in the coil presumably because the movement of the balls is not in resonance with, nor consonant with any harmonic of the spring vibrations. Moreover, the vibration of any one ball must obviously differ from one instant to the next and differ one ball with the others.

Fig. 4 shows a compression spring 22 arranged for vertical mounting 24 and deflected by vibrations as at 26. The operation of this spring is much the same as that already shown and described with respect to Figs. 1, 2 and 3, except that, as will be seen in Fig. 5 the lower balls are spaced closer together than the upper, and those between increase their spacing progressively from the lower end toward the upper end.

Figure 5:
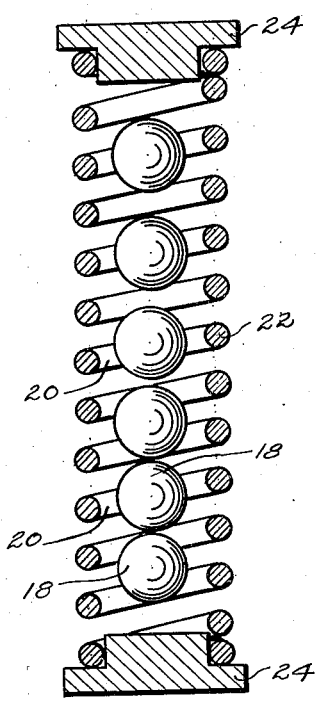
Fig. 5 shows the spring of Fig. 4 with the corrective means which is the subject of this invention applied.
Figure 6:
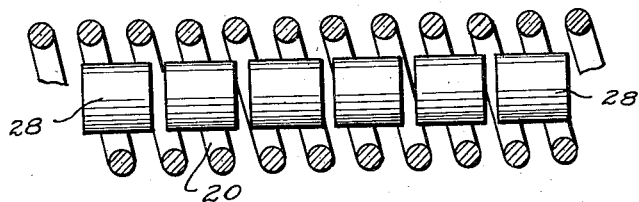
Fig. 6 shows a spring which may be either extension or compression but having corrective means of a slightly different form.

The spring shown in Fig. 6 may be mounted either in compression or in extension, and differs only from those heretofore shown in the corrective means employed, which in this case comprises a series of slugs in the form of small short cylinders of about the same diameter as the balls shown in Figs. 3 and 5 and of a length about equal to their diameter.

It will of course be understood that other sizes and shapes of corrective masses may be employed to good advantage as long as they do not escape from between the coils of the spring nor out the ends thereof and as long as the masses collectively do not have a resonant vibration which corresponds to that of the spring, a condition which is substantially impossible to attain.

The herein described spring damper has many advantages over the known art. (1) It provides a tension or compression spring with a self-contained damping medium which prevents the build-up of radial or transverse resonant modes of the spring. (2) No adjustments are required and mechanical wear is held to a minimum. (3) No complicated mechanisms are required, and the device is simple, yet effective in operation. (4) The balls are retained by the physical configuration of conventional springs. (5) The device may be used on conventional springs without design or manufacturing changes.

Having described my invention, I claim:

1. The combination of an axially stressed coil spring and a means for damping axially transverse vibrations in said spring, which comprises a series of balls within the coils of the spring, said balls being small enough to permit axially transverse vibrations of the balls with respect to the spring and large enough to prevent their passage between the coils of the spring or out the ends thereof.

2. The combination of an axially stressed coil spring and a means for damping axially transverse vibrations in said spring, which comprises a plurality of balls within the coils of said spring, said balls being smaller than the inside diameter of the spring and larger than the space between adjacent coils or the open spaces at the ends of the spring.

3. The combination of a coil spring, end supports for holding said coil spring extended and a means for damping axially transverse vibrations in said spring, which comprises a longitudinally disposed series of balls within the coils of said spring, said balls being smaller than the inside diameter of said spring but larger than the space between turns or the spaces past the ends of the spring or past the end supports.

4. The combination of a coil spring, end supports for holding said coil spring compressed, and a means for damping axially transverse vibrations in said spring, which comprises a longitudinal row of balls within the coils of said spring, said balls being smaller than the inside diameter of said spring but larger than any openings between the coils or at the ends.

5. The combination of a coil spring, end supports for holding said coil spring extended with its axis horizontal, and a means for damping axially transverse vibrations in said spring, which comprises a series of balls within the coils of said spring, said balls being smaller than the inside diameter of said spring but larger than the space between the turns or the spaces past the ends of the spring or past the end supports, the combined diameters of the balls being less than the axial space within the spring.

6. The combination of a coil spring, end supports for holding said coil spring extended with its axis vertical, and a means for damping axially transverse vibrations in said spring, which comprises an axially extending row of balls within the coils of said spring, said balls being smaller than the inside diameter of said spring but larger than the space between turns or the spaces past the ends of the spring or past the end supports, the combined diameters of the balls being less than the axial space between the end supports.

7. The combination of a coil spring, end supports for holding said coil spring compressed with its axis horizontal, and a means for damping axially transverse vibrations in said spring, which comprises an axially extending series of balls within the coils of said spring, said balls being smaller than the inside diameter of said spring but larger than the space between the turns or the spaces past the ends of the spring or past the end supports, and of a combined length of less than the length of the space within the spring.

8. The combination of a coil spring, end supports for holding said coil spring in compression with its axis vertical, and a means for damping axially transverse vibrations in said spring, which comprises an axially extending row of balls within the coils of said spring, said balls being smaller than the inside diameter of said spring but larger than the space between the turns or the spaces past the ends of the spring or past the end supports, the length of said row of balls when placed one above the other in a straight line being less than the vertical space between the end supports.

9. The combination of a coil spring and a means for damping axially-transverse vibrations in said spring, which comprises a plurality of separate masses loosely contained within the coils of said spring, said masses being of a size which will prevent their escape through the spaces between the coils of the spring but allow axially-transverse movement of the masses within the spring.

DWIGHT C. KENNARD, Jr.

REFERENCES CITED

The following references are of record in the file of this patent:

UNITED STATES PATENTS

| Number | Name | Date |
|---|---|---|
| 1,927,153 | Conrader | Sept. 19, 1933 |
| 2,118,150 | Brinkley | May 24, 1938 |
| 2,344,858 | Farmer | Mar. 21, 1944 |
| 2,370,111 | Stoudt | Feb. 20, 1945 |